United States Patent

[11] 3,570,447

| [72] | Inventors | Mark T. Basseches<br>Pleasantville;<br>Paula T. Basseches, Scarsdale, N.Y. |
|---|---|---|
| [21] | Appl. No. | 774,248 |
| [22] | Filed | Nov. 8, 1968 |
| [45] | Patented | Mar. 16, 1971 |
| [73] | Assignee | Said Paula T. Basseches<br>assignor to Robert T. Basseches<br>Chevy Chase, Md. |

[54] LAWN SPRINKLER ALARM
11 Claims, 8 Drawing Figs.

[52] U.S. Cl. .................................................. 116/112,
116/118, 137/216, 169/23, 239/72
[51] Int. Cl. ...................................................... G08b 21/00
[50] Field of Search .......................................... 116/65, 67,
109, 112, 117, 118; 239/542, 72, 251; 137/216;
141/94, 95, 96; 73/(Inquired); 169/5, 16, 23, 26,
29, 37

[56] References Cited
UNITED STATES PATENTS

| 125,063 | 3/1872 | Martin | 169/16 |
|---|---|---|---|
| 1,746,575 | 2/1930 | Barner | 239/251 |
| 1,821,579 | 9/1931 | Rader | 239/251 |
| 2,323,701 | 7/1943 | Barksdale | 239/251X |
| 2,580,157 | 12/1951 | Chadwick | 141/96 |
| 2,845,302 | 7/1958 | Hanf | 239/204X |
| 2,878,774 | 3/1959 | Carroll | 116/112 |
| 3,033,467 | 5/1962 | Hofer | 239/204 |

Primary Examiner—Louis J. Capozi
Attorney—Mark T. Basseches and Paula T. Basseches ABSTRACT: A lawn sprinkler having a warning mechanism incorporated therein for emitting a telltale warning signal responsive to admission of water pressure into the apparatus.

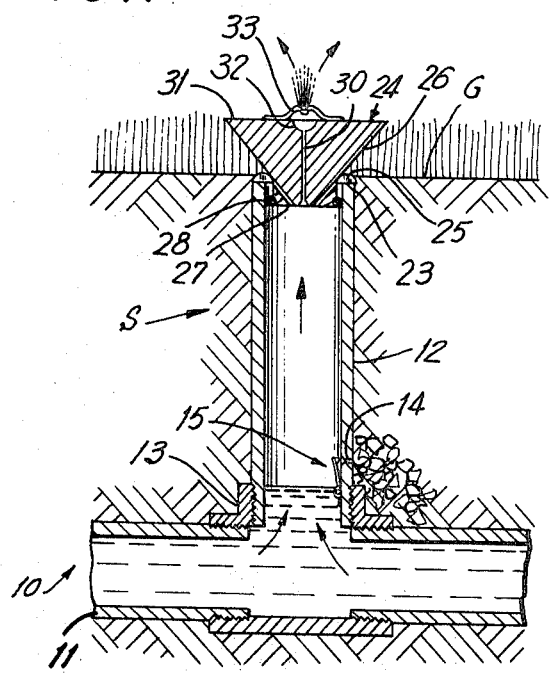
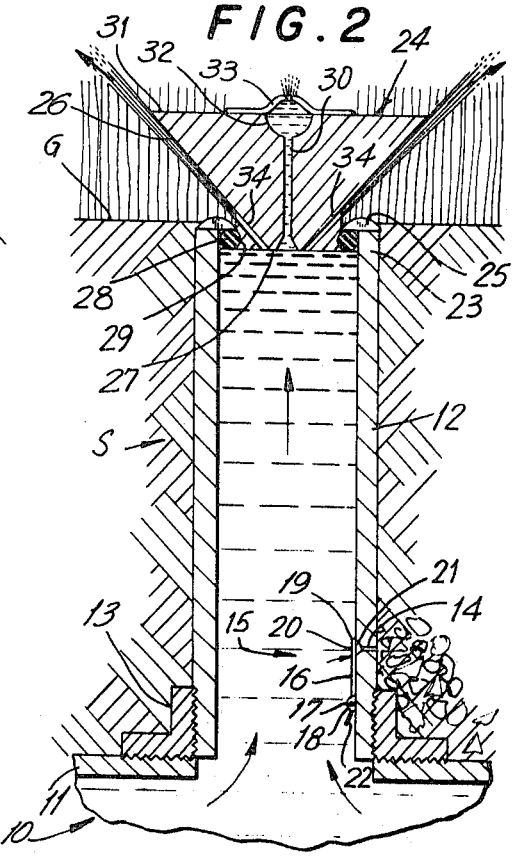
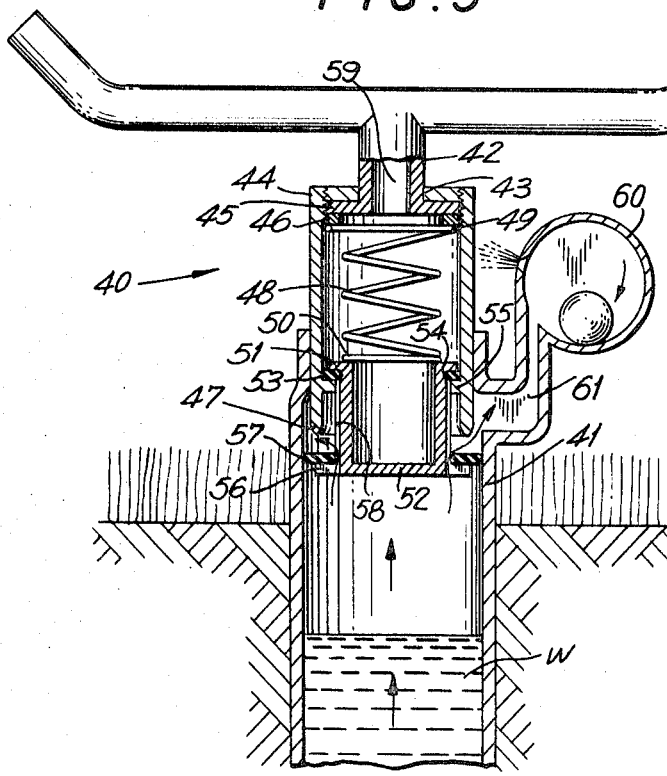
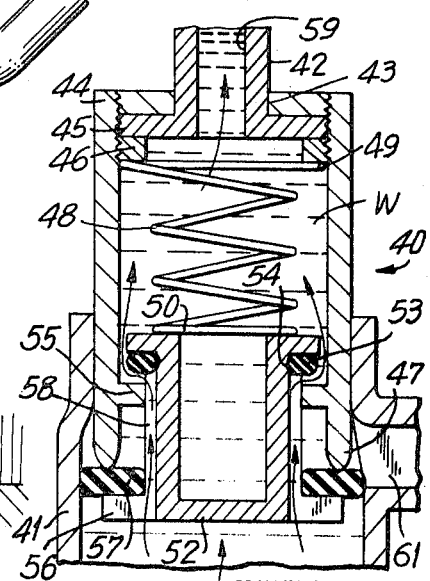
INVENTORS
MARK T. BASSECHES
PAULA T. BASSECHES

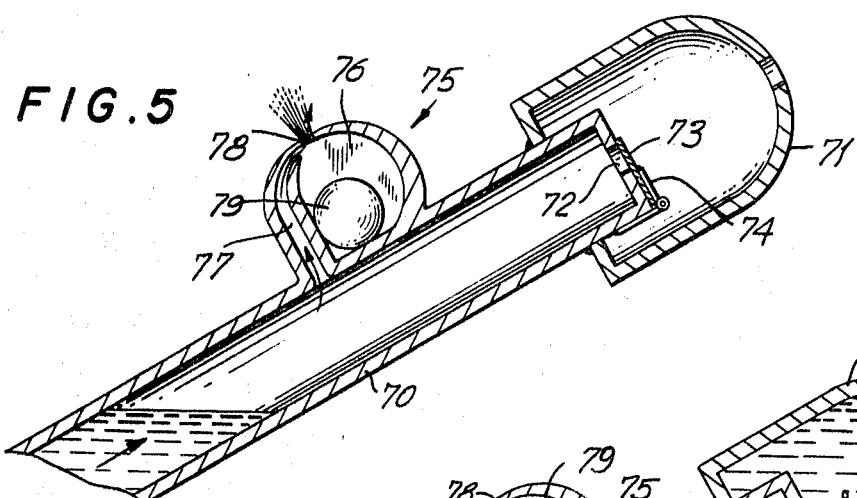
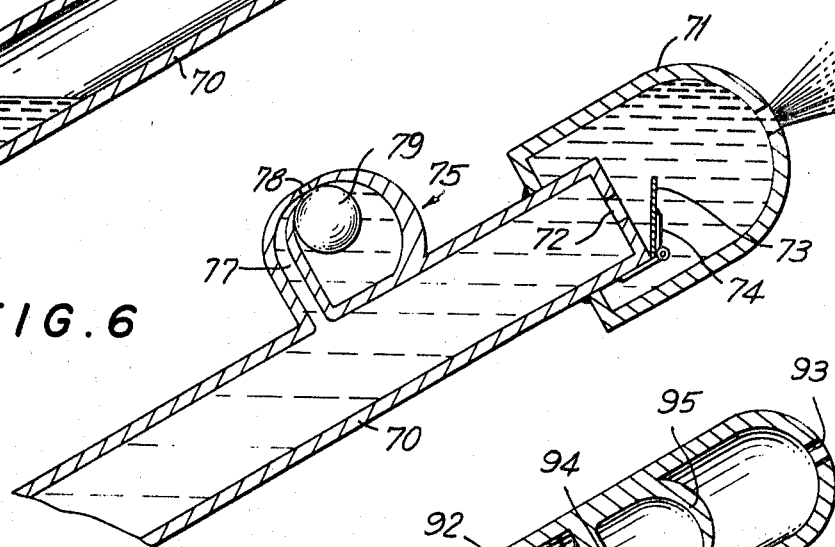
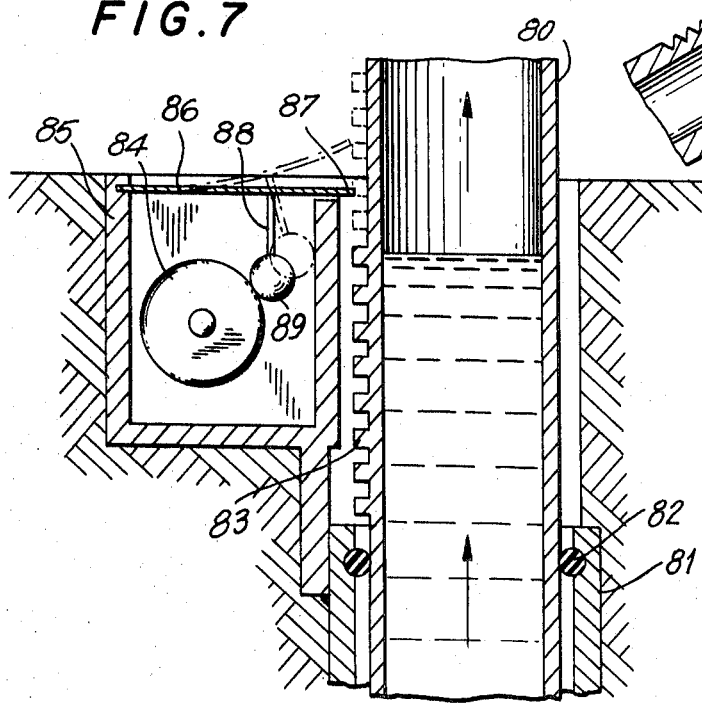
INVENTORS
MARK T. BASSECHES
PAULA T. BASSECHES

LAWN SPRINKLER ALARM

BACKGROUND OF THE INVENTION

1. Field of the Invention

This invention is in the field of lawn sprinkler systems, such as are frequently used to water lawns, golf courses, flower beds, green houses and like applications.

2. Description of the Prior Art

There is currently a trend toward providing lawns, golf courses, flower beds, farms and like environments with automated water means. A frequent practice in the construction and renovation of lawns or other areas requiring watering is to install a series of permanent underground sprinklers connected to a water supply source. Control means periodically open solenoid valves, admitting water to selected sprinkler heads.

In many instances the control means for the solenoid valves is remotely located and operated by timing apparatus which permits the home owner to set an automatic clock mechanism which will activate a given sprinkler or set of sprinklers at a predetermined time or times during the day or week, to water the area serviced by the sprinklers for the selected period. Timing and watering devices of this sort are very frequently installed in golf courses, being set for cyclical operation in which, for instance, they may be activated for a period of 15 minutes every 3 hours.

It will be readily recognized that if a person is standing in an area when a sprinkler covering the area is suddenly activated, the person will be subjected to a soaking which is, to say the least, unpleasant and unnerving.

SUMMARY OF THE INVENTION

A sprinkler device which produces sonic warning or alarm to apprise persons in the immediate area to be sprayed of the imminent commencement of a spraying operation. The sonic warning is directly emitted by the sprinkler mechanism so as to enable persons in the area to localize the exact source of the spray which will follow, to permit immediate evasive action.

In accordance with an embodiment of the invention, the alarm signal is effected by the initial expulsion of air from the apparatus.

Optionally, in accordance with such embodiment, means may be provided for admitting air to the device after completion of a spraying operation to assure an adequate supply of air for the signal alarm, although such special air-admitting means need not be provided with all sprinklers since, in many instances, the natural drainage-leakage-evaporation factors automatically admit a required quantity of air. The presence of air adjacent the spray head which must be expelled prior to water reaching the head provides the further advantage of delaying the actual emission of spray.

In accordance with a further embodiment of the invention, particularly adapted for use with sprinklers of the so called "popup" type which are shifted from a dormant, concealed to an elevated, watering position by the admission of water, a sound emitting means may be activated by the physical shifting of the sprinkler head from the dormant to the active position.

With the foregoing in mind, it is an object of the invention to provide a spray head assembly which automatically emits a warning signal responsive to activation, the signal being automatically stilled during watering.

A further object of the invention is the provision of a spray assembly of the type described wherein the signal is effected by air expelled from the spray head assembly by the introduction of water to the assembly.

A further object of the invention is the provision of a warning spray assembly of the type described including a drain aperture or valve to assure the presence of air required for operation of the sonic warning device.

A further object of the invention is the provision of a device of the type described in which an air exhaust orifice and a water exhaust orifice are employed, the air exhaust orifice including an air-activated signal, the device including valves which interrupt the connection between the main conduit and the orifice during the period of time that air is being expelled, and which shut the air exhaust orifice and open the water orifice after expulsion of air has been completed.

A further object of the invention is the provision of a watering spray having a whistle attachment wherein a whistle member includes a float which acts to modulate the air during the period when air is being expelled, the float serving to seal the air expulsion orifice when the air has been expelled.

A further object of the invention is the provision of a sound generator attachment for watering devices of the so-called "popup" type wherein the signal is emitted responsive to movement from the collapsed position to the popped-up position.

A further object of the invention is the provision of a sonic generator attachment which may be used in conjunction with existing spray head watering assemblies.

Reference will now be made to the drawings, forming a part hereof, in which:

FIG. 1 is a vertical sectional view through a lawn sprinkler device in accordance with the invention, in the alarm signalling position;

FIG. 2 is a magnified, fragmentary view of the embodiment of FIG. 1 in the lawn-sprinkling position;

FIG. 3 is a vertical sectional view through a further embodiment of the invention, in the alarm signalling position;

FIG. 4 is a magnified sectional view of the embodiment of FIG. 3 in the watering position;

FIG. 5 is a vertical sectional view through a portion of a spray head in accordance with a further embodiment of the invention, in the alarm signalling position thereof;

FIG. 6 is a view similar to FIG. 5 showing the position of the parts when water is being dispensed;

FIG. 7 is a vertical sectional view depicting a further embodiment of the invention;

FIG. 8 is a sectional view through a further embodiment of the invention.

**Referring now to the embodiment of FIGS. 1 and 2, 10 is a water supply conduit through which water is intermittently fed when it is desired to spray a lawn, section or area covered by the spray. The conduit 10 may service a plurality of separate spray heads, as signified by the open end portion 11 leading to other spray heads. Alternatively, as is well knwown, the portion 11 may be capped and only a single spray head may be fed by the conduit.

A vertical discharge pipe 12 is threadedly connected to a T fitting 13 secured to the main conduit 10. The discharge conduit 12 is normally sunk beneath the ground line G.

Optionally but preferably, a small drain aperture 14 is formed through the discharge pipe 12 at a lower portion thereof. In the installation of the sprinkler apparatus S of the type employing a drain hole 14, a supply of gravel or stone is preferably disposed at least in the area adjacent the drain aperture 14, to permit draining of water from the pipe above the aperture.

A valve member 15 is disposed within the pipe 12 and functions to open the aperture 14 when there is no pressure in the pipe and to close the aperture when pressure is applied. The valve 15 may be of any known type, the illustrated valve including a body portion 16 pivotally connected about a horizontal pivot axis 17, the pivot being supported by a pair of ears 18 made fast to the interior of the pipe 12, or to a bracket secured to the interior.

A plug member 19 is fixed to the upper end 20 of the body portion 16 at a position opposite the enlarged valve seat 21 leading to the drain aperture 14. The body portion of the valve includes a tailpiece 22 which, in the unpressurized condition of the valve, maintains the plug 19 in slightly spaced relation to the seat 21.

From the foregoing it will be readily recognized that the valve assembly 15 acts as a form of normally open flapper valve, permitting the drain aperture to communicate with the interior of the pipe 12 until such time as pressure is developed within the pipe. When the valve is subjected to pressure, the water or air pressure within the pipe will forece the valve to closed position, seating the plug 19 in the seat 21 and preventing flow through the aperture 14.

At the upper end 23 of the pipe 12 there is mounted a spray head assembly 24. The head assembly 24 is permitted a range of vertical movement, as best seen by comparing FIGS. 1 and 2.

The upper end of the pipe 12 is provided with an inturned flange 25. The spray head 24 includes a frustoconic sidewall portion 26 which, in the downward or dormant position shown in FIG. 1, is seated against and forms an essentially airtight seal with flange 25. The spray head 24, at its lower end 27, is provided with an outwardly extending annular collar 28, which collar prevents the head 24 from being displaced in an outward direction by engagement of the collar against the undersurface of flange 25.

In the illustrated embodiment, the collar 28 comprises an O-ring which may be seated in groove 29 adjacent the lower end 27 of the head.

The head 24 is preferably comprised of a relatively heavy, corrosion resistant material, such as brass, and includes a central passage 30 extending from the bottom 27 to the top 31 of the spray head. Adjacent the upper terminal end 32 of the passage there is fastened a whistle member 33 which, by reason of its juxtaposition to the bore 30 and passage end 32, will emit a whistling sound when air is expelled through the passage 30.

The operation of the device of FIGS. 1 and 2 will be readily understood from the foregoing description.

In the dormant position shown is FIG. 1, the valve 15 will have permitted water, which was in the pipe 12 following a previous watering, to have drained out of the pipe. When water pressure is introduced into the main conduit 10, the valve 15 will immediately close and, as water rises in the pipe, the air entrapped will be expelled from the pipe through the bore 30, causing a whistling sound.

By reason of the weight of the spray head assembly 24, the seal between the flange 25 and the frustoconic side portion 26 will be maintained during the expulsion of all or substantially all of the air. In instances of particularly high water pressure, the spray head may become temporarily unseated until an equilibrium is reached, at which time the head will reseat and air will again be expelled through the passage 30, to reinstate the sonic signal.

When all of the air has been expressed from the pipe 12 and water reaches the level of the spray head, the additional force of the water will cause the spray head to lift to the position shown in FIG. 2. In this position, the water will be free to be discharged through spray passages 34, which passages were not communicated with the atmosphere by lay below the flange 25 in the depressed position of the spray head shown in FIG. 1.

So long as water pressure continues in the pipe 12, the normal spray activity will continue, uninterrupted by sonic interference. Normally, by reason of the restricted nature of the bore 30, the limited amount of water escaping through such bore will not materially affect the spray capacity. However, if desired and as more fully illustrated in connection with a succeeding embodiment, it is feasible to deploy a float valve in the area directly beneath the whistle 33.

While the spray head 24 has been described as comprising a heavy brass fixture, such as would be practicable where high water pressures are available, a light weight material or even a float may be preferred in areas with limited water pressure. Optionally, the force required to maintain the head in the seated position during the expulsion of air may be developed by a spring in a manner similar to that described in connection with the embodiment of FIGS. 3 and 4.

It will be further understood that the drain or flapper valve 15 may not be required in all installations, particularly where the watering is effected at widespread intervals, such as once a day or once every other day. In such cases, the normal leakage or runoff in the main conduit will function to lower the water level, permitting a sufficient quantity of signal-activating air to enter the pipe 12. Also, where installations are employed for relatively short watering periods, separated by extended dormant periods, a small drainage aperture may be used without a flapper valve.

Referring now to the embodiment of FIGS. 3 and 4, which may or may not employ the drain valve, as desired, there is shown a spray assembly 40 at the upper end of a pipe 41, which pipe is connected to a water source. In this instance conventional rotary spray delivery member 42 is mounted in an opening 43 at the upper end of a cap member 44. The spray head includes a flange 45 supported on an inwardly directed collar 46, it being understood that the flange and head 42 spin relative to the capping member in a well understood manner when water is expelled from the head.

The lower end of the cap member is provided with a downwardly directed valve seat portion 47. A light spring 48 has its upper end 49 seated against collar 46, the lower end 50 of the spring being pressed against an outwardly directed radial flange 51 formed on a valve spool 52. The gasket or O-ring members 53 is fixed in a groove 54 adjacent the flange 51 of the spool.

The capping member includes a lower annular shoulder portion 55 extending radially inwardly, the spring 48 pressing the O-ring 53 against the shoulder portion 55 to form a seal. The spool 52 includes a lower shoulder portion 56 carrying a lower gasket 57. It will be understood that when the spool 52 is shifted upwardly by water pressure, in the manner hereinafter set forth, the lower gasket 57 will be pressed against the valve seat portion 47 and the seal between O-ring 53 and shoulder 55 will be broken. The sidewalls of the spool 52 are fluted, as shown at 58.

In the dormant and the sound emitting positions shown in FIG. 3, the supply pipe 41 is maintained out of communication with the bore 59 in the spray head 42 by reason of the spring 48 pressing the O-ring 53 against the flange 55.

The supply pipe 41 includes a whistle assembly 60, having conduit 61 connected to the pipe at a position below the seal formed between the O-ring 53 and the flange 55. As will be observed from the arrows in FIG. 3, the conduit 61 is in initial communication with the pipe 41, and air entrapped in the pipe is permitted to bypass the gasket 57 through the flutes 58. When water pressure is admitted to the pipe 41, the rising water W will drive air entrapped in the pipe upwardly, the only escape path for such air being through the conduit 61 leading to the whistle assembly 60, causing a loud whistling sound. The pressure of the air is not normally sufficient to compress the spring 48 and thus unseat the O-ring 53 from the flange 55 and, therefore, air cannot escape through the spray head but is restricted to escaping through the whistle. If higher pressures are encountered, it will be observed that the whistle signal will still sound, the sound however being of shorter duration.

A loud whistling sound will continue until the pressure within the pipe 41 is sufficient to overcome the downward force of the spring 48, a condition which will always occur when water engages against the under surface of the spool 52. In this condition, the parts are shifted to the position shown in FIG. 4 wherein the gasket 57 is pressed against the valve seat 47. With the gasket 57 thus disposed, it will be observed that the conduit 61 is sealed and a fluid path to the spray head 42 occurs, as shown by the arrows, FIG. 4, such path being through the flutes 58 around the now elevated O-ring 53 and into the chamber within which the spring is disposed. Thus, when air is introduced into the spray head, as shown in FIGS. 3 and 4, a loud whistling sound will be emitted for a period of time until water fills the pipe 41.

In the embodiment of FIGS. 5 and 6, the sonic device is shown as embodied directly on the spray head of a watering device. In this embodiment, the conduit 70 leads to an essentially conventional spray head 71. The conduit includes a flow passage 72 at its upper end, communicating the head 71 with the conduit. A valve plate 73, under the pressure of a very light spring 74, is disposed in a normal blocking relation of the passage 72. A whistle assembly 75 includes a whistle chamber 76 communicated to the pipe 70 by a passage 77. A whistle aperture 78 normally connects the whistle chamber 76 to the atmosphere.

When pressure is introduced into the pipe 70, air entrapped within the pipe and in any conduits leading to the pipe, is forced through the passage 77, into the whistle chamber and out the aperture 78, causing a lud whistling sound. the valve plate 73 prevents air from being expelled through the head 71.

When water has filled the pipe 70, a hollow plastic or pith ball 79 forming a component of the whistle will have been caused to float to the upper portion of the whistle chamber, sealing the aperture 78, whereupon the pressure will be sufficiently great to overcome the spring 74 of the valve, causing the valve to open and communicate water to the spray head 71. It will be readily understood, depending upon the water pressures encountered, that the valve plate 73 need not be held closed by a spring, but a gravity valve may be satisfactory under certain circumstances.

Also, in the embodiment and the prior embodiment, there have been shown separate apertures for the expulsion of air and for the expulsion of water. From the teachings, however, it will be appreciated that single aperture may be provided which is effective to produce a sound when air is expelled, such aperture also functioning to produce a spray when water is expelled.

In FIG. 7 there is shown a still further embodiment useful in connection with watering devices of the so-called "popup" type, in which a substantially vertical movement of the discharge pipe precedes, by reason of known internal valving, the actual expulsion of water.

In the embodiment of FIG. 7, 80 represents the conduit carrying the spray head (not shown) and 81 represents a telescoping conduit slidably connected to the conduit 80, the conduit being maintained in seated relation by a packing 82. It will be appreciated that, upon introduction of water into the apparatus, the pipe 80 shifts vertically upwardly, such shifting movement being permitted by the slidable connection of the packing 82.

To one side of the conduit there are provided a series of ratchetlike teeth 83. A bell or like signalling means 84 is mounted in a casing 85 just below ground level. A spring clapper 86 is affixed to the casing and includes a finger portion 87, in the nature of a pawl, disposed in the path of the upwardly moving teeth 83. A further spring arm 88 is attached to the clapper 86, the arm including at its lower extremity a striker knob 89. As shown in dot and dash lines, upon vertical movement of the member 80, the finger 87 is progressively engaged by the teeth 83 and released suddenly after traversing a side edge of each tooth, whereupon the knob 89 will be sprung into engagement with bell 84, producing a succession of warning signals.

In the illustrated embodiment, the conduit 80 will be locked in its elevated position by the clapper assembly and must be manually reset by positive downward pressure on the spring head assembly. However, it will be readily appreciated that should automatic descending movement be desired, mechanism may readily be designed which will pivot the clapper horizontally clear of the teeth, at the completion of the lifting movements of the spray head by a cam or like mechanism, permitting the head to descend. Similarly, with a completion of the descending movement there may be provided a second cam which again pivots the clapper member horizontally to a path in registry with the teeth, so that the teeth will again engage the clapper when the pipe 80 is again shifted upwardly.

FIG. 8 shows a modification of the invention which has particular utility in connection with existing spray head devices. In this embodiment, 90 is a threaded fitting at the terminal end of an existing spray apparatus. The substitute head 91 includes a threaded portion 92 adapted to be received on the portion 40. Interposed between the spray orifice 93 and the threaded portion 92, there is formed a whistle assembly including a restricted orifice 94 and a resonator 95 defining a chamber confining a lightweight ball, such as a pith or hollow plastic ball 96.

In the operation of this embodiment, when air is expelled from the conduit 90, the whistle will produce a loud sound until water fills the chamber, causing the pith ball to float clear of the space 97 between the resonator 95 and the orifice 93.

While it is possible, as shown in the embodiment of FIG. 8, to provide a single orifice for the discharge of both the air and the water, it has been determined to be preferred, from the standpoint of both sonic and spray efficiency, to provide separate vents for the air and the spray. It is further preferred, in order to make optimum use of the limited quantity of air available for sonic production, that valve means be provided for blocking the normally wider water spray conduits during the air venting stages of the operation.

It will be readily recognized from the foregoing that the duration of the sound produced will be a function of the amount of air expelled prior to water reaching the spray head and the speed with which such air is vented. Where a longer warning signal is desired, for instance, such longer signal may be readily achieved, particularly where there is a considerable vertical separation of the main conduit from the spray head, by disposing a drain valve a considerable distance below the spray head.

In the light of the foregoing teachings, other forms of sound producing mechanisms effective to create warning signals prior to the beginning of a water cycle and to shut off at the start of the watering cycle may suggest themselves to workers in the art. The invention is therefore not to be taken as limited to the forms specifically shown but, rather, the invention is to be broadly construed within the scope of the appended claims.

We claim:

1. A warning signal lawn sprinkler device comprising, in combination, a water supply conduit, a spray head operatively connected to said supply conduit, air vent means for discharging air from said device responsive to the flow of water into said supply conduit, and alarm signal means for sounding an alarm (responsive to air flow in said vent means), said signal means being powered by movement of air in said vent means.

2. A warning signal lawn sprinkler device comprising a water supply conduit leading to a spray head and air activated alarm means operatively connected to said conduit for sounding an alarm signal (responsive to the expulsion of air), said alarm means being energized by the movement of air expelled from said conduit.

3. A device in accordance with claim 2 and including drain means in said conduit at a position remote from said head for draining water from the portions of said conduit between the head and drain means, thus to introduce air into said portions.

4. A device in accordance with claim 3 wherein said drain means comprises a valve which is closed responsive to the introduction of pressure into said conduit and opened responsive to interruption of said pressure.

5. A warning signal lawn sprinkler device comprising a main water supply conduit, a spray head connected to said conduit, an air exhaust outlet connected to said conduit, air-activated alarm means in said exhaust outlet for producing a warning sound responsive to passage of air through said outlet, and valve means interposed between said spray head and conduit to seal said spray head and thus divert air entrapped in said sprinkler to said exhaust outlet, said valve means connecting said conduit to said spray head when exposed to water from said supply conduit.

6. A device in accordance with claim 5 wherein said valve means seals said exhaust outlet when said conduit is connected to said spray head.

7. A device in accordance with claim 5 and including means in said conduit for introducing air in said conduit behind said valve when water pressure is interrupted in said water supply conduit.

8. A device in accordance with claim 7 wherein said means for introducing air comprises a drain valve which is closed when said main conduit is pressurized and open when said main conduit is not pressurized.

9. In a sprinkler device or the like including a main conduit leading to a spray head, an air-activated alarm comprising a chamber having an air vent opening communicating with said conduit, an escape aperture in said chamber, whistle means for producing sound energized by movement of air through said aperture, and float means in said chamber for sealing said aperture responsive to the admission of water into said chamber.

10. A device in accordance with claim 9 wherein said float means modulates the air flow through said aperture prior to filling of said chamber.

11. A warning signal lawn sprinkler device comprising a main conduit member, a spray head member movably mounted on said conduit member and positioned to receive fluid passing through said conduit member, means for moving said spray head member relative to said conduit member from a depressed, dormant position to an extended watering position responsive to the admission of water under pressure into said main conduit member, a movable striker on one said member, bell means on the other said member positioned to be engaged by said striker, and means for urging said striker against said bell means to produce a sonic alarm responsive to movement of said head member from said dormant to watering position.